United States Patent
Sugaya (10) Patent No.: US 8,726,098 B2
(45) Date of Patent: May 13, 2014

(54) DIAGNOSTIC METHOD, DIAGNOSTIC CODE GENERATION SYSTEM, AND PROGRAM FOR THE SAME

(75) Inventor: Shunji Sugaya, Tokyo (JP)

(73) Assignee: OPTiM Corporation, Saga (JP)

( * ) Notice: Subject to any disclaimer, the term of this patent is extended or adjusted under 35 U.S.C. 154(b) by 236 days.

(21) Appl. No.: 13/272,889

(22) Filed: Oct. 13, 2011

(65) Prior Publication Data

US 2013/0086421 A1 Apr. 4, 2013

(30) Foreign Application Priority Data

Sep. 29, 2011 (JP) .................................. 2011-214164

(51) Int. Cl.
*G06F 11/00* (2006.01)
(52) U.S. Cl.
USPC .............................................. 714/46; 714/32
(58) Field of Classification Search
USPC ................ 714/32, 44–46, 47.1, 38.1
See application file for complete search history.

(56) References Cited

U.S. PATENT DOCUMENTS

| | | | |
|---|---|---|---|
| 6,279,123 B1 * | 8/2001 | Mulrooney | 714/35 |
| 7,249,283 B2 * | 7/2007 | Platteter | 714/25 |
| 2009/0138855 A1 * | 5/2009 | Huene et al. | 717/125 |

FOREIGN PATENT DOCUMENTS

| | | | |
|---|---|---|---|
| JP | 2003006062 A | 1/2003 |
| JP | 2005228004 A | 8/2005 |
| JP | 2011034315 A | 2/2011 |

* cited by examiner

*Primary Examiner* — Dieu-Minh Le
(74) *Attorney, Agent, or Firm* — BainwoodHuang (57) ABSTRACT

The operator terminal 150 receives input in relation to a setting status check item being a setting item desired to be checked in the diagnostic code generation terminal, and generates a status check code, so that the status check code indicates the setting status check item received in the input. Then, the diagnostic code generation terminal 10 acquires the setting status of the diagnostic code generation terminal 10 in response to receiving the input of the status check code, the setting status corresponding to the setting status check item, and generates a diagnostic code indicating the setting status based on the acquired setting status. Then, the setting status of the diagnostic code generation terminal 10 is reproduced by inputting the diagnostic code to an operator terminal 150.

15 Claims, 9 Drawing Sheets

Fig.5
<Status check code input screen>

Fig.6
<Diagnostic code output screen>

Fig.7

<STATUS CHECK CODE GENERATION LIST>

| | STATUS CHECK CONTENT | DIGIT NUMBER |
|---|---|---|
| 1 | CPU UTILIZATION | 1 |
| 2 | RADIO WAVE CONDITION OF 3G | 2 |
| 3 | Wi-Fi STATUS | 3 |
| 4 | DATA CAPACITY | 4 |
| 5 | BASIC DEVICE | 5 |
| 6 | POWER SAVING MODE | 6 |

Fig.8

<DIAGNOSTIC CODE GENERATION LIST>

| | SETTING STATUS CONTENT | DIAGNOSTIC RESULT | DIGIT NUMBER |
|---|---|---|---|
| 1 | CPU UTILIZATION | 0~100 | 7 |
| 2 | RADIO WAVE CONDITION OF 3G | YES :1, NO :0 | 1 |
| 3 | Wi-Fi STATUS | YES :1, NO :0 | 1 |
| 4 | DATA CAPACITY | 0~100 | 7 |
| 5 | BASIC DEVICE | YES :1, NO :0 | 1 |
| 6 | POWER SAVING MODE | ON :1, OFF :0 | 1 |

<RECOMMENDED CHECK ITEM DISPLAY PROCESS>

Fig.14

DIAGNOSTIC METHOD, DIAGNOSTIC CODE GENERATION SYSTEM, AND PROGRAM FOR THE SAME

This application is based on and claims the benefit of priority from Japanese Patent Application No. 2011-214164, filed on 29 Sep. 2011, the content and teachings of which are incorporated herein by reference.

TECHNICAL FIELD

The present invention relates to a diagnostic method, a diagnostic code generation system, and a program for the same that utilize a diagnostic code used for remotely supporting a smart phone, a personal computer, and the like.

BACKGROUND ART

In recent years, various services have been provided for users by connecting portable terminals with a web server and the like through a public line network. In particular, advanced services, which have been provided for personal computers conventionally, has become possible to provide for mobile phones by the appearance of smart phones (highly functional mobile phones).

In order to maximize the use of such advanced web services and the high functionality of smart phones, users need to know the operation of configuration and the function of a smart phone. In addition, if users who are not used to the operation configure their own terminals for the first time, configuration information that should not be deleted may actually be deleted, or inappropriate configuration may be set to cause an error.

For approaching such problems, there has been a known method of remotely supporting (remote maintain) a user's terminal from a system so as to remotely configure the user's terminal and so as to remotely login the user's terminal to change the settings and to guide the setting operation. For example, PLT 1 discloses that a server acquires the screen information of each client to be supported and constantly displays a list of this screen information so as to improve the performance of support and monitoring for a user.

In addition, PLT 2 discloses the technology capable of remote support by transferring the screen information of a user terminal through the use of augmented reality achieved by means of the camera of a mobile phone.

CITATION LIST

Patent Literature

PLT 1: Japanese Unexamined Patent Application 2003-6062
PLT 2: Japanese Unexamined Patent Application 2011-34315
PLT 3: Japanese Unexamined Patent Application 2005-228004

SUMMARY OF INVENTION

However, in the case of remote support by transferring user's screen information in this way, transferring user's private information as screen information may allow the operator side to view this private information. Specifically, an operator may know user's data such as user's ID, password, interest, and the like.

In addition, when allowed to login from an operator terminal to a user terminal through remote login or the like and operate the user terminal, an operator can freely manipulate data in the user terminal. As a result, a user may not notice if an operator views and replicates the data. Such a user's anxiety may prevent an explosive boom of the remote support system.

Furthermore, in transferring user's screen information and remote support conducting remote login, users cannot receive support while offline. A user wishes to receive remote support required for communication, but diagnosis for recovering from the failure may not be able to be started during communication failure.

Then, some of the present improvements focus attention to high needs of the system allowing an operator to know the setting status of the user terminal without transferring screen information of the user terminal while the user is offline.

As a similar technology, the remote maintenance method using error codes has been conventionally known (for example, PLT 3). This patent literature discloses that the error diagnosis of a user terminal is performed to generate an error code corresponding to an error and display the content of the error based on the error code on a maker terminal, thereby allowing an operator to know the error status and recover from it. Since such a system using error codes generates a code indicating only the content of an error after diagnosis, the digit number of an error code itself does not become too long.

Unlike the error code, when the items to diagnosed increase, a diagnostic code for knowing the status of the user terminal tends to be increased. In general, since devices and functions have been increased by highly sophisticated user terminals such as smart phones, the items to be diagnosed have also been increased. This leads to the increase of the digit number of a diagnostic code reflecting the setting status of a user terminal, thereby making the handling of a diagnostic code difficult. For example, in the case in which a user reads a diagnostic code aloud through phone or the like, the user may misread the code if it is too long, resulting in a wrong diagnosis.

In addition, in the method of PLT 3, it takes a long time to wait for the completion of the error check module because many devices and modules of the user terminal are scanned in order to identify an error. In particular, when an operator provides support through phone, the support time is required to be reduced. Therefore, it is desirable to eliminate useless checks for a user terminal.

An object of the present invention is to provide a diagnostic method, a diagnostic code generation system, and a program for the same, in which no private information of the user terminal is leaked unlike screen transfer, errors in reproduction of the setting status less likely occur, and no useless diagnoses are performed, in order to check the setting status of a user terminal.

According to a first aspect of the present invention, the diagnostic method capable of reproducing the setting status of a diagnostic code generation terminal in an operator terminal includes the steps of:

receiving input by the operator terminal, in relation to a setting status check item being a setting item desired to be checked in the diagnostic code generation terminal;

generating a status check code by the operator terminal, so that the status check code indicates the setting status check item received in the input;

acquiring the setting status of the diagnostic code generation terminal by the diagnostic code generation terminal in response to receiving the input of the status check code, the setting status corresponding to the setting status check item;

generating a diagnostic code indicating the setting status based on the acquired setting status; and reproducing the setting status of the diagnostic code generation terminal by inputting the diagnostic code to the operator terminal.

According to the first aspect of the present invention, the operator terminal receives input in relation to a setting status check item being a setting item desired to be checked in the diagnostic code generation terminal, and generates a status check code, so that the status check code indicates the setting status check item received in the input. Then, the diagnostic code generation terminal acquires the setting status of the diagnostic code generation terminal in response to receiving the input of the status check code, in which the setting status corresponds to the setting status check item, and generates a diagnostic code indicating the setting status based on the acquired setting status. Then, the setting status of the diagnostic code generation terminal is reproduced by inputting the diagnostic code to an operator terminal.

The operator side generates the status check code indicating only the setting status desired to be checked and reproduces the setting status, so that an operator can check on a desired local setting status with no useless diagnoses executed. In other words, no useless diagnosis processes are executed, so that the digit number of a status check code and a diagnostic code can be reduced, thereby preventing a mistake of transferring these codes and reducing errors in reproduction of the setting status. As a result, the present invention can provide a diagnostic code generation terminal capable of diagnosis while offline, in which no user's private information is leaked unlike screen transfer, errors in reproduction of the setting status less likely occur, and no useless diagnoses are performed, in order to check user's setting status.

In categories of the invention, a diagnostic code generation system and a program for the same have functions and effects similar to those of the diagnostic method according to the first aspect of the present invention.

According to a second aspect of the present invention, the method according to the first aspect of the present invention further includes the steps of:

receiving an inquiry keyword by the operator terminal, the inquiry keyword being input by an operator;

extracting a setting status check item set recommended for the input from the operator based on the inquiry keyword; and displaying the extracted setting status check item set on the operator terminal.

Accordingly, a user can inform an operator of a setting status check item set based on a keyword inquired by a user. Therefore, a user can prompt an operator to select a diagnosis item corresponding to diagnosis desired by the user.

In categories of the invention, a diagnostic code generation system and a program for the same have functions and effects similar to those of the diagnostic method according to the second aspect of the present invention.

According to a third aspect of the present invention, in the method according to the first aspect of the present invention, the step of reproducing the setting status of the diagnostic code generation terminal based on the status check code and the diagnostic code.

In categories of the invention, a diagnostic code generation system and a program for the same have functions and effects similar to those of the diagnostic method according to the third aspect of the present invention.

According to the present invention, a diagnostic method, a diagnostic code generation system, and a program for the same can be provided, in which a diagnostic result is generated as a diagnostic code, user's private information cannot be leaked unlike screen transfer, errors in reproduction of the setting status less likely occur, and no useless diagnoses are performed, in order to check the setting status of a user terminal.

DESCRIPTION OF EMBODIMENTS

Hereinafter, a best mode of the present invention will be described with reference to the attached drawings. However, this is illustrative only, and the technological scope of the present invention is not limited thereto.

Configuration of Diagnostic Code Generation System

Figure 1:
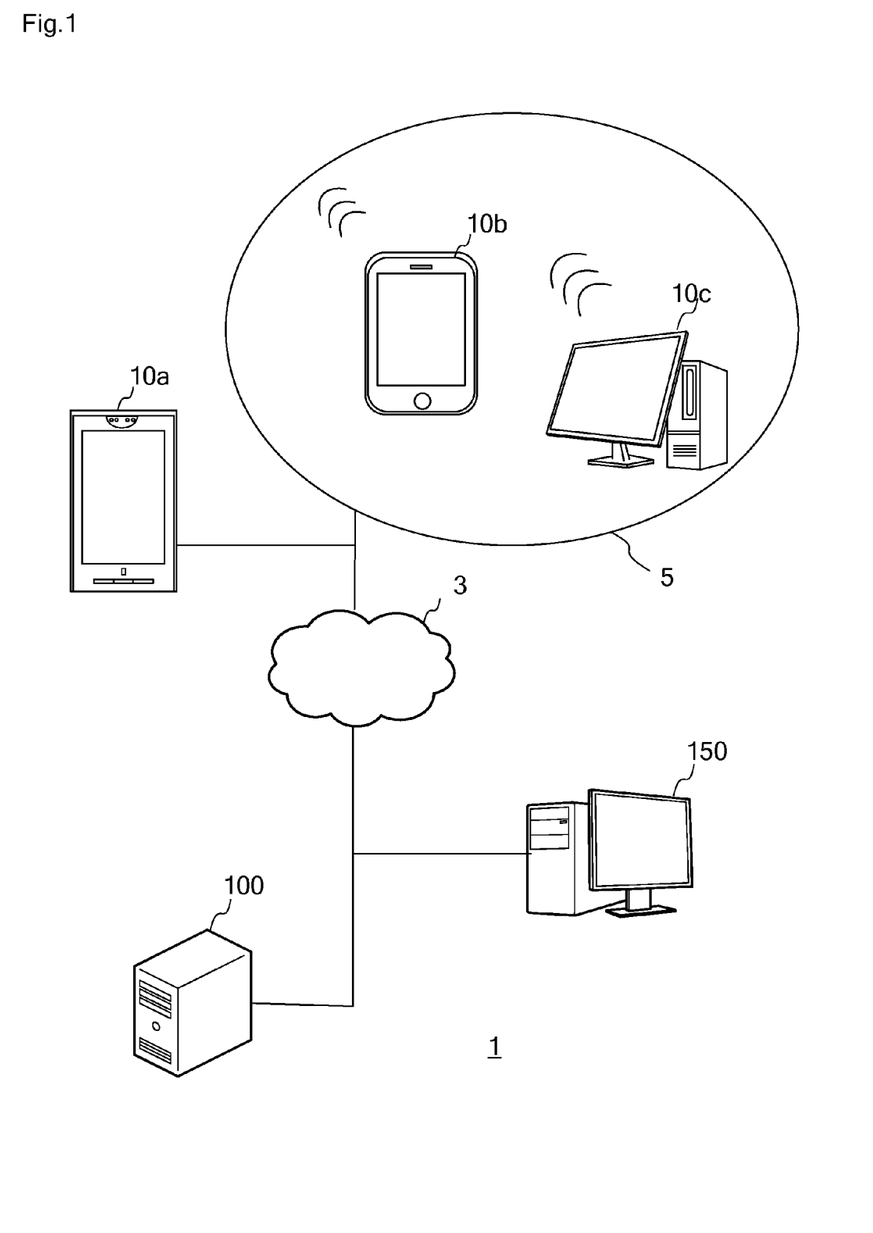
FIG. 1 shows the overall schematic diagram of a diagnostic code generation system 1.

FIG. 1 is the system configuration diagram of a diagnostic code generation system 1 that is a preferred embodiment of the present invention. The diagnostic code generation system 1 includes diagnostic code generation terminals 10a, 10b, and 10c (hereinafter simply referred to as "diagnostic code generation terminal 10"), a public line network 3 (e.g., an Internet network, a third generation communication network, a fourth generation communication network, etc.), and an operator terminal 150 (remote terminal). The operator server 100 is not an indispensable component as described hereinafter.

The diagnostic code generation terminal 10 and the operator terminal 150 or the operator server 100 each may be connected with a public line network 3. Enabling data communication between the diagnostic code generation terminal 10 and the operator terminal 150 or the operator server 100 is not a requisite element of the present embodiment.

Like the diagnostic code generation terminals 10b and 10c, the diagnostic code generation terminal 10 may be connected with a public line network 3 through a local area network 5. Alternatively, like the diagnostic code generation terminal 10a, the diagnostic code generation terminal 10 may communicate with a base station through radio waves so as to connect with a public line network 3 through the base station connected with an exchanger, without a local area network 5.

The diagnostic code generation terminal 10 may be a general information terminal used by users, which is an information technology device or an electric appliance, which is provided with the below-mentioned functions including a verbal communication function. The diagnostic code generation terminal 10 may be, for example, a smart phone 10a, a slate terminal 10b, a personal computer 10c, and a mobile phone, or may be general information appliances such as a home phone, a net book terminal, an electronic book terminal, and an electronic dictionary terminal.

The operator terminal 150 is an information terminal such as a general personal computer used by an operator who provides support for a diagnostic code generation terminal 10.

Functions

Figure 2:
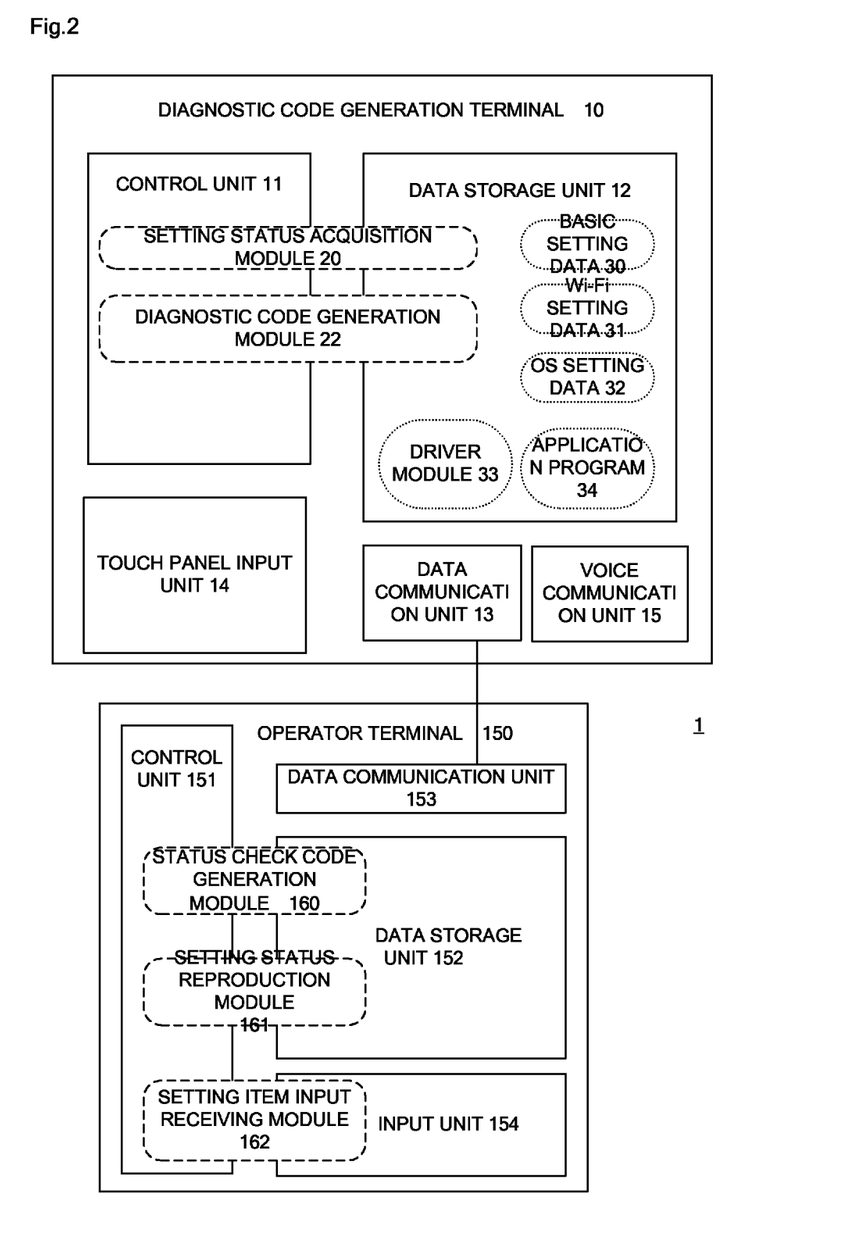
FIG. 2 shows the functional block diagram of a diagnostic code generation terminal 10 and an operator terminal 150.

FIG. 2 shows the functional block diagram of a diagnostic code generation terminal 10 and an operator terminal 150. The function and the hardware setting of each device will be explained with reference to FIG. 2.

The diagnostic code generation terminal 10 is a terminal to be diagnosed, which is used by general users. If only provided with a control unit 11, a data storage unit 12, a data communication unit 13, a touch panel input unit 14, and a voice communication unit 15, the diagnostic code generation terminal 10 may be any of a home electrical appliance, a business electrical appliance, a portable terminal, and a business terminal.

Diagnosis in the present embodiment is a process for acquiring the status of the diagnostic code generation terminal 10, for example, which may acquire the setting status of the diagnostic code generation terminal 10 and may further include the error status of the hardware or the software.

The control unit 11 include a central processing unit (hereinafter referred to as "CPU"), a random access memory (hereinafter referred to as "RAM"), and a read only memory (hereinafter referred to as "ROM"), and the like; and the data communication unit 13 includes a Wireless Fidelity® or WiFi® enabled device complying with, for example, IEEE802.11; or a wireless device complying with the IMT-2000 standard such as the third generation mobile communication system, or the like. The communication unit 13 may include a wired device for LAN connection.

The data storage unit 12 includes any or all of an HDD (Hard Disk Drive), an SSD (Solid State Drive), a memory, and the like. In addition, the touch panel input unit 14 includes a display unit such as a liquid crystal monitor displaying images and text messages; and an input unit such as a touch panel receiving input from a user. The touch panel input unit 14 may be provided with a voice input unit.

In the data storage unit 12, the status check code generation list and the diagnostic code generation list, as described above, are stored.

The data storage unit 12 stores data to be diagnosed. The data to be diagnosed is, for example, basic setting data 30 describing data on the basic setting of the diagnostic code generation terminal 10, Wi-Fi setting data 31 describing data on the settings of Wi-Fi, OS setting data 32 describing data on the setting of the operating system, a driver module 33 that is a hardware driver operable in the diagnostic code generation terminal 10, and an application program 34 that is a program for an application operable in the diagnostic code generation terminal 10.

In the case in which the data to be diagnosed is any of the setting data, for example, a predetermined setting value described in the setting data (which is a setting value desired to be reproduced in the operator terminal 150) is to be diagnosed. On the other hand, in the case in which the data to be diagnosed is a driver module 33 or an application program 34, for example, whether or not the driver module 33 or the application program 34, respectively, is normally installed is to be diagnosed.

The voice communication unit 15 is a device provided with an audio data receiving and output function receiving utterances with the other side (an operator) communicating with a user as digital signals to be heard by the user; and an audio data transmission function inputting user's utterances as digital signals and transmitting the user's utterances to a phone and the like of the other side as audio data.

The diagnostic code generation terminal 10 achieves a setting status acquisition module 20 and a diagnostic code generation module 22 by the control unit 11 reading out a predetermined program from the data storage unit 12.

The operator terminal 150 is a terminal used by an operator who supports users. The operator terminal 150 may be a computer such as a general personal computer. The hardware setting of the operator terminal 150 may be the same as that of the diagnostic code generation terminal 10, and therefore the explanation is omitted. Unlike the diagnostic code generation terminal 10, an input unit 154 of the operator terminal 150 may be a general keyboard and a general monitor, without limiting to a touch panel.

In the data storage unit 152, the status check code generation list and the diagnostic code generation list, as described above, are stored.

The operator terminal 150 achieves a status check code generation module 160 and a setting status reproduction module 161 by a control unit 151 cooperating with the data storage unit 152. The operator terminal 150 achieves a check item input receiving module 162 by a control unit 151 cooperating with the input unit 154.

The operator server 100 is not an indispensable component of the present invention but may be a server relaying communication between the diagnostic code generation terminal 10 and the operator terminal 150. Similarly, the operator server 100 may also be provided with a control unit, a data storage unit, and a data communication unit to achieve the status check code generation module 160 and the setting status reproduction module 161 by the control unit cooperating with the data storage unit.

If only achieved by the operator server 100, the setting status reproduction module 161 and the status check code generation module 160 may not be provided in the operator terminal 150, and the present embodiment is thus achieved through so-called software as a service (hereinafter referred to as "SaaS"). In this case, the operator terminal 150 functions as an input/output terminal.

In other words, the status check code generation module 160 operating in the operator server 100 generates a status check code and displays it in the operator terminal 150, based on the setting status check item determined by the operator terminal 150. Alternatively, the operator server 100 receives a diagnostic code input from the operator terminal 150, and the operator server 100 determines a diagnosis item to execute the reproduction process, based on this diagnostic code. The operator terminal 150 receives and outputs this reproduced output result.

Setting Status Reproduction Process

Figure 3:
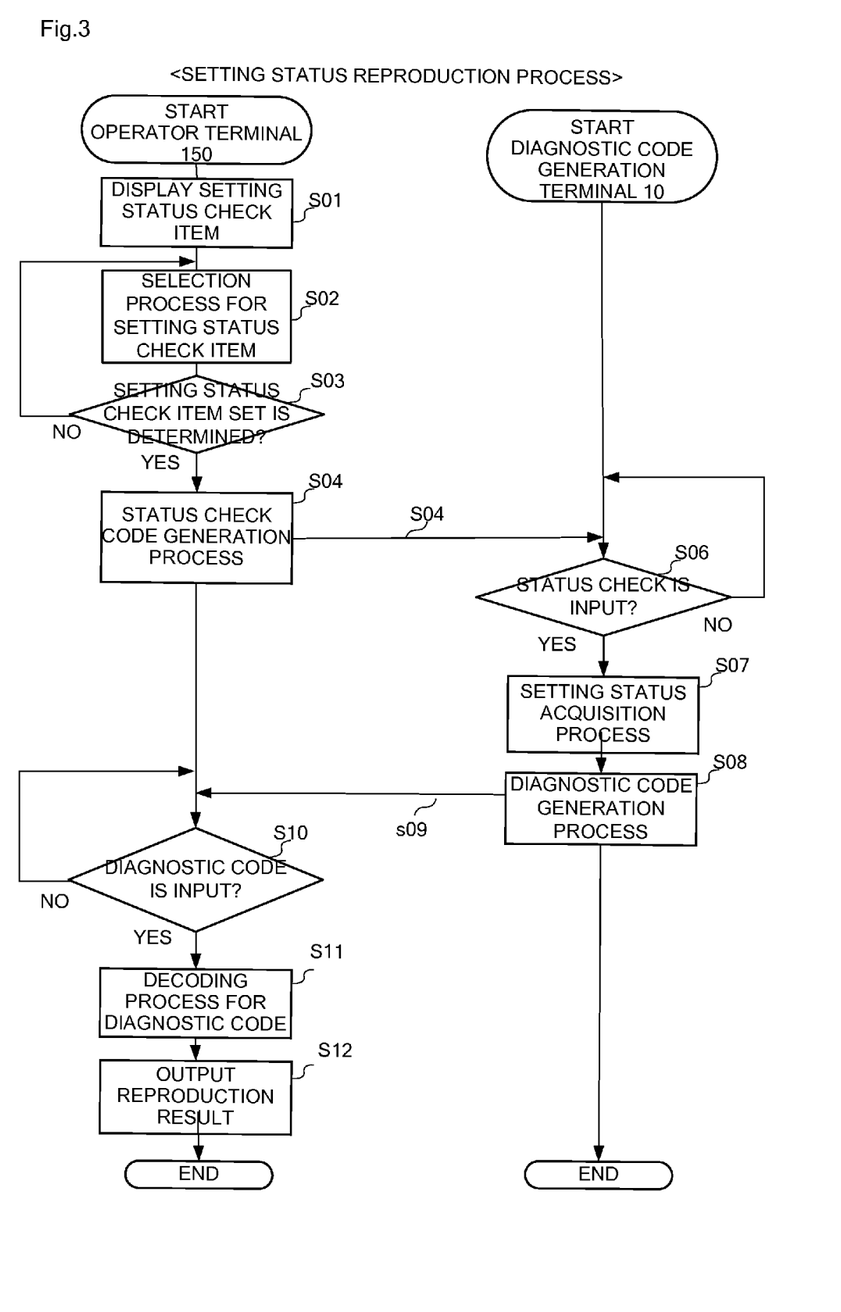
FIG. 3 shows the flow chart illustrating the setting status reproduction process executed by a diagnostic code generation terminal 10 and an operator terminal 150.

The setting status reproduction process executed by the operator terminal 150 and the diagnostic code generation terminal 10 will be explained based on FIG. 3. At the start, the operator terminal 150 displays a setting status check item (Step S01). The setting status check item is a setting item or a setting status of hardware or software desired to be checked by an operator, among the statuses of the diagnostic code generation terminal 10

Figure 4:
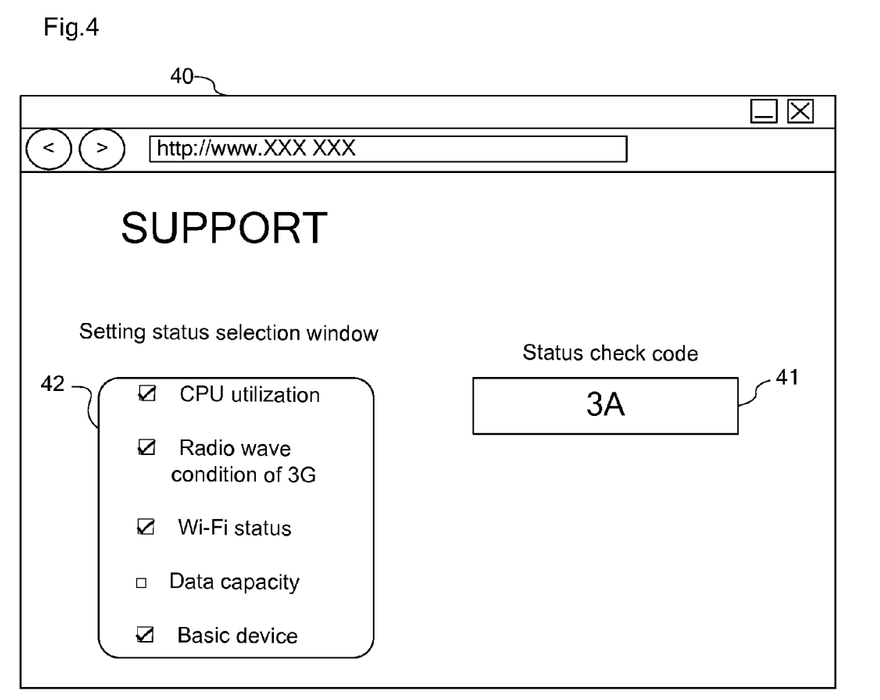
FIG. 4 shows the output screen image of a status check code output to an operator terminal 150.

Like the screen image 40 of FIG. 4, the check item input receiving module 162 displays the setting status selection window 42 on the operator terminal 150. In the example of FIG. 4, the setting status check item corresponds to CPU utilization, Radio wave condition of 3G, Wi-Fi status, Data capacity, and Basic device. All of the setting status check items are displayed in the setting status selection window 42.

Then, the check item input receiving module 162 executes the selection process for a setting status check item (Step S02). In the selection process for a setting status check item, the setting status check item is selected by operator's input operation. In the example of FIG. 4, an operator checks a checkbox corresponding to each setting status check item such as CPU utilization or the like to select a setting status check item. At this time, an operator typically selects a plurality of setting status check items (CPU utilization, Radio wave condition of 3G, Wi-Fi status, and Basic device shown in FIG. 4). At this time, a plurality of selected setting status check items make up a setting status check item set.

If a plurality of setting status check items are selected by an operator, and a setting completion button (not shown) or the like is operated (or selected), the check item input receiving module 162 determines a setting status check item set (Step S03: "YES"), and then moves the process to the step S04. The process is waiting in the step S02 until this determination.

Then, the status check code generation module 160 of the operator terminal 150 generates a status check code based on the determined setting status check item set (Step S04). The status check code is a value or a character string representing the determined setting status check item set.

Figure 7:
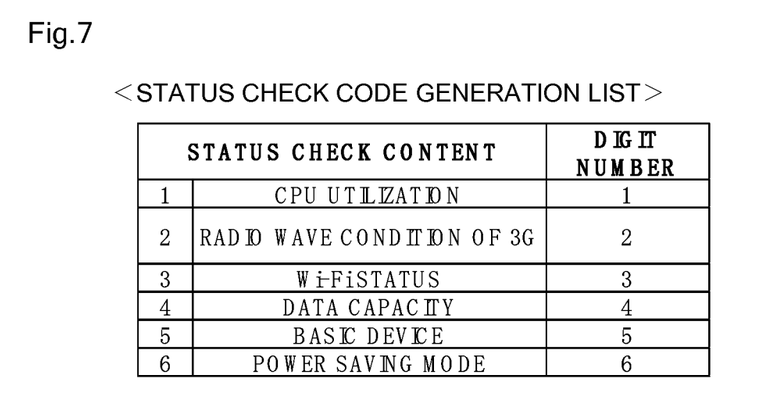
FIG. 7 is the status check code generation list stored in an operator terminal 150.

The status check code generation module 160 refers to the status check code generation list shown in FIG. 7 to form binary numbers composed of "0" or "1" depending on whether respective setting status check items are selected by an operator.

For example, the setting status check item set is composed of six items: CPU utilization, Radio wave condition of 3G, Wi-Fi status, Data capacity, Basic device, and Power saving mode and determined in this order. Then, CPU utilization, Radio wave condition of 3G, Wi-Fi status, Basic device are selected as setting status check items, but Data capacity or Power saving mode are not.

When a setting status check item is selected, the value is set to "1." When a setting status check item is not selected, the value is set to "0." In the above-mentioned case, "CPU utilization" has been selected, thereby setting the sixth digit of a status check code to "1," "Radio wave condition of 3G" has been selected, thereby setting the fifth digit of a status check code to "1," and the digits of a status code that correspond to other selected setting status check items are set to "1" in the order of this setting status check item set. "Data capacity" or "Power saving mode" has not been selected, thereby setting the fourth and the sixth digits of a status check code to "0," respectively. As a result, the status check code will be "111010." This is represented in e.g. hexadecimal notation to generate a status check code "3A."

As shown in FIG. 4, the generated status check code is output to the operator terminal 150.

Figure 5:
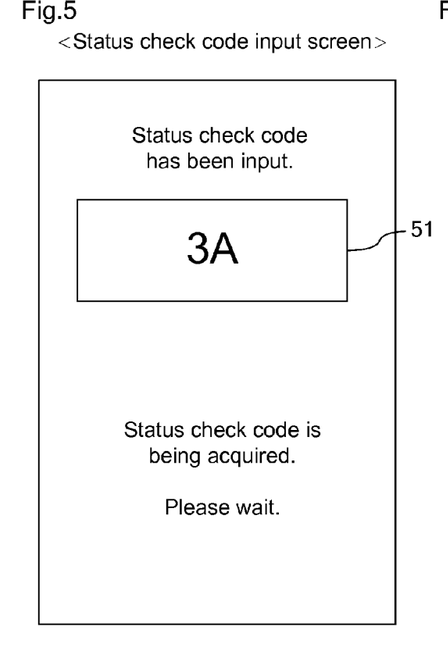
FIG. 5 shows the input screen image of a status check code output to a diagnostic code generation terminal 10.

At this point, when the diagnostic code generation terminal 10 and the operator terminal 150 are not connected, thereby not enabling data communication with each other, an operator tells the generated status check code through phone or the like to a user who operates the diagnostic code generation terminal 10. The status check code input screen shown in FIG. 5 is displayed on the diagnostic code generation terminal 10. Then, the user inputs the status check code received from the operator, to the status check code input window 51 (Step S06: "YES"), and the process is moved to the step S07. Otherwise, the process waits until a status check code is input (Step S06: "NO").

On the other hand, when the diagnostic code generation terminal 10 and the operator terminal 150 are connected for enabling data communication with each other, the operator terminal 150 transmits a generated diagnostic code to the diagnostic code generation terminal 10 (Step or arrow S05). The diagnostic code generation terminal 10 inputs a status check code based on a status check code received from the operator terminal 150 without waiting for input from a user (Step S06: "YES"), and moves the process to the step S07. Otherwise, the process waits until a status check code is input (Step S06: "NO").

Then, the setting status acquisition module 20 executes the setting status acquisition process (Step S07). Specifically, the setting status acquisition module 20 decodes a status check code with the status check code generation list and extracts a setting status check item to be checked. Then, the setting status acquisition module 20 starts a setting status acquisition program preliminarily associated with each setting status check item to be checked to acquire the setting status corresponding to each item.

Figure 8:
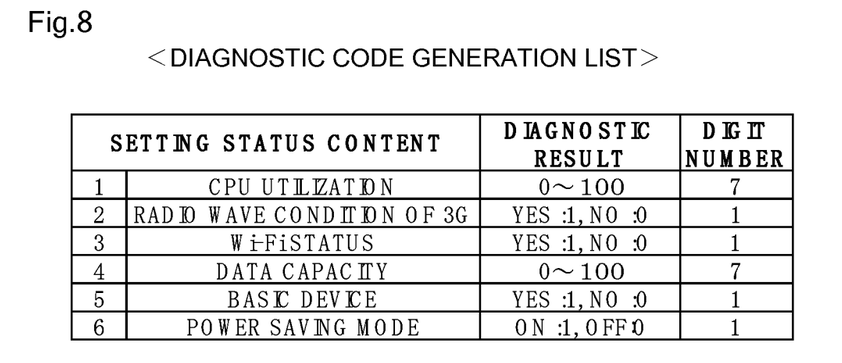
FIG. 8 shows the diagnostic code generation list stored in a diagnostic code generation terminal 10.

Then, from the setting status corresponding to each item, the diagnostic code generation module 22 refers to the diagnostic code generation list shown in FIG. 8 to generate a diagnostic code. (Step S08). A diagnostic code is a value or a character string representing the setting status of a specified setting status check item. In the above-mentioned example, the setting status check item set is composed of six items: CPU utilization, Radio wave condition of 3G, Wi-Fi status, and Basic device in this order, and the setting status of which are acquired. At this point, the setting statuses of respective items is CPU utilization of "15%," Radio wave condition of 3G of "YES," Wi-Fi status of "YES," and Basic device of "YES" as one example.

Since represented by a number from 0 to 100, CPU utilization can be expressed with 7 digits of binary numbers. Thus, in these 7 digits, 15% is represented by "0001111." Then, Radio wave condition of 3G is set to "1" for "YES," Wi-Fi status is set to "1" for "YES," and Basic device is set to "1" for "YES." Arranging these binary digits starting with the result of CPU utilization from the left to the right provides "0001111-1-1-1." Converting this binary number to hexadecimal generates a diagnostic code "7F."

Figure 6:
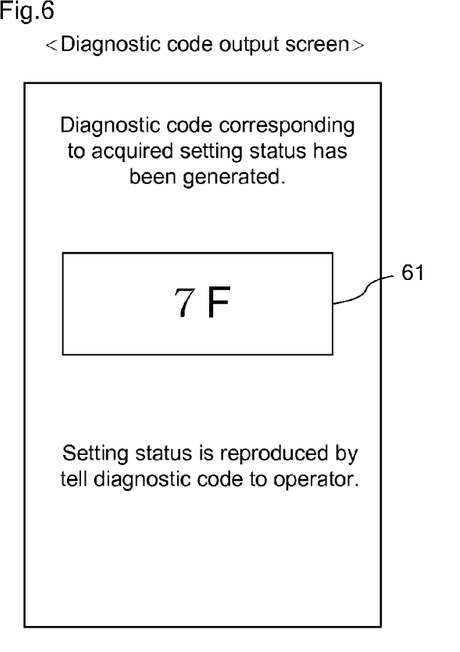
FIG. 6 shows the output screen image of a diagnostic code output to a diagnostic code generation terminal 10.

When the diagnostic code generation terminal 10 and the operator terminal 150 are not connected, thereby not enabling data communication with each other, the diagnostic code generation terminal 10 outputs a generated diagnostic code for display like the example showing in FIG. 6. When phone call is enabled, an operator prompts a user to read the displayed diagnostic code aloud, and the user tells the diagnostic code to the operator.

Figure 9:
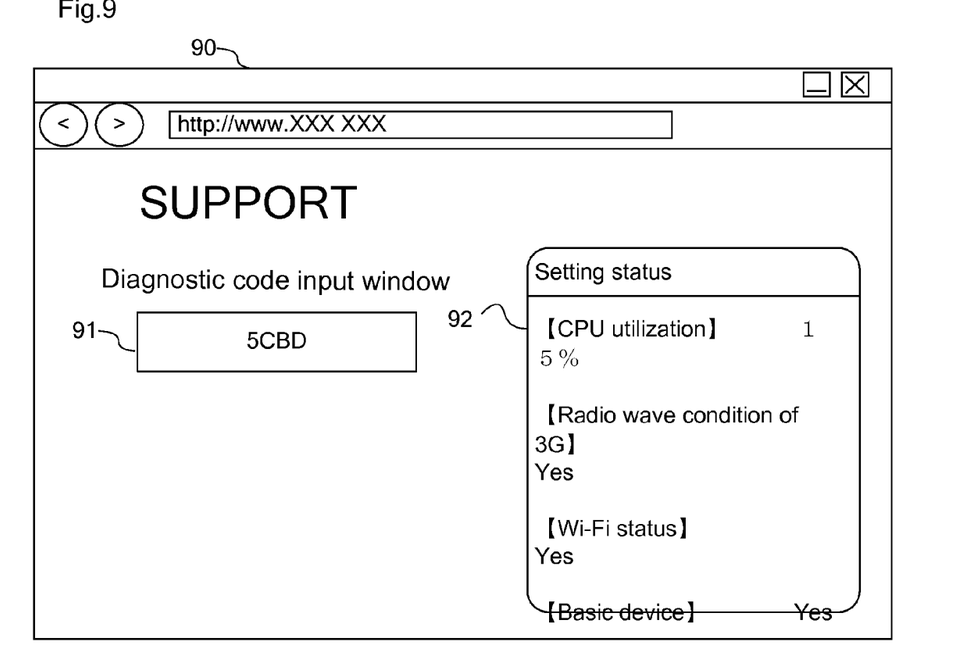
FIG. 9 shows the image of the setting status reproduction screen output to an operator terminal 150.

As shown in FIG. 9, the operator terminal 150 displays the diagnostic code input window 91, which receives input of the diagnostic code from an operator. The operator inputs the diagnostic code received from the user (Step S10: "YES"), and the process is moved to the step S11. Otherwise, the process waits until a diagnostic code is input (Step S10: "NO").

On the other hand, when the diagnostic code generation terminal 10 and the operator terminal 150 are connected for enabling data communication with each other, the diagnostic code generation terminal 10 transmits a generated diagnostic code to the operator terminal 150 (Step or arrow S09). The operator terminal 150 determines that a diagnostic code is input when received a diagnostic code (Step S10: "YES"), and the process is moved to the step S11. Otherwise, the process waits until a diagnostic code is input (Step S10: "NO").

Then, the setting status reproduction module 161 of the operator terminal 150 conducts the decoding process for a diagnostic code based on a diagnostic code, a status check code, and the diagnostic code generation list (Step S11). In the above-mentioned example, when the status check code is "1110110," the content of the setting status check is "CPU utilization," "Radio wave condition of 3G," "Wi-Fi status," and "Basic device." On the other hand, the diagnostic code is "0001111-1-1-1." With reference to the diagnostic code generation list, CPU utilization has seven digits, and thus the value of CPU utilization is set from the first to the seventh digits. Radio wave condition of 3G after CPU utilization is set to "1" for "YES." The setting status is decoded with respect to each setting status check item in this manner.

Then, the setting status reproduction module 161 of the operator terminal 150 outputs the result of the reproduced setting status (Step S12). As shown in FIG. 9, the reproduced setting status 92 is displayed on the operator terminal 150.

The process, in which the operator terminal 150 supports an operator to select an appropriate setting status check item when an operator selects a setting status check item, will be explained hereinafter. Diagnostic problem resolution largely depends on which a setting status check item an operator selects. Then, the process supported by the operator terminal 150 to allow an operator to select an appropriate setting status check item will be explained hereinafter.

Registration Process for Setting Status Check Item Set

The operator terminal 150 receives input of the operator ID of an operator who uses the operator terminal. In other words, an authentication server (which may be the operator server 100) communicatably connected with the operator terminal 150 manages an operator ID together with a password. The operator terminal 150 displays an input window for an operator ID and a password to prompt an operator to input the operator ID and the password and receives the input. When an operator ID and a password are input, the operator terminal 150 transmits the operator ID and the password that are input to a recognition server, which recognizes the operator ID. The operator terminal 150 receives this recognition result.

Figure 10:
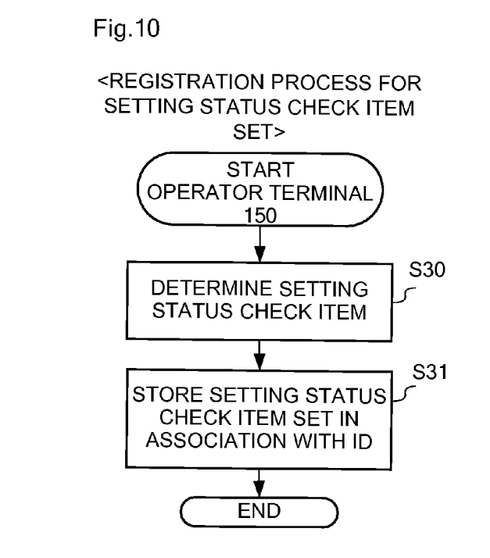
FIG. 10 shows the flow chart illustrating the registration process for a setting status check item set executed by an operator terminal 150.

The registration process for the setting status check item set will be explained with reference to FIG. 10. When a setting status check item is determined (Step S03: "YES") in the step S03 of the setting status reproduction process, the operator terminal 150 executes the process from the step S30. When a setting status check item is determined, the operator terminal 150 stores a plurality of decided setting status check items as a set in association with an operator ID (Step S31). The associated and stored data may be stored in the operator terminal 150, or may be stored in the communicatable operator server 100 or the like.

Select Template Display Process

Figure 11:
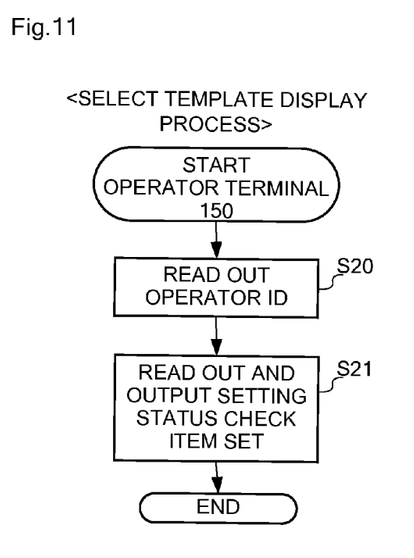
FIG. 11 shows the flow chart illustrating the select template display process executed by an operator terminal 150.

The select template display process will be explained with reference to FIG. 11. In the step S01 of the setting status reproduction process, the present process is executed in parallel with display of a setting status check item. At the start, the operator terminal 150 reads out an operator ID input to the operator terminal 150 (Step S20). Then, the operator terminal reads out and outputs a setting status check item set stored during the registration process for the setting status check item set based on the operator ID (Step S21). When data associated with the operator ID and the setting status check item set is stored in the operator server 100 or the like, the operator terminal accesses the operator server 100 for this readout.

Figure 12:
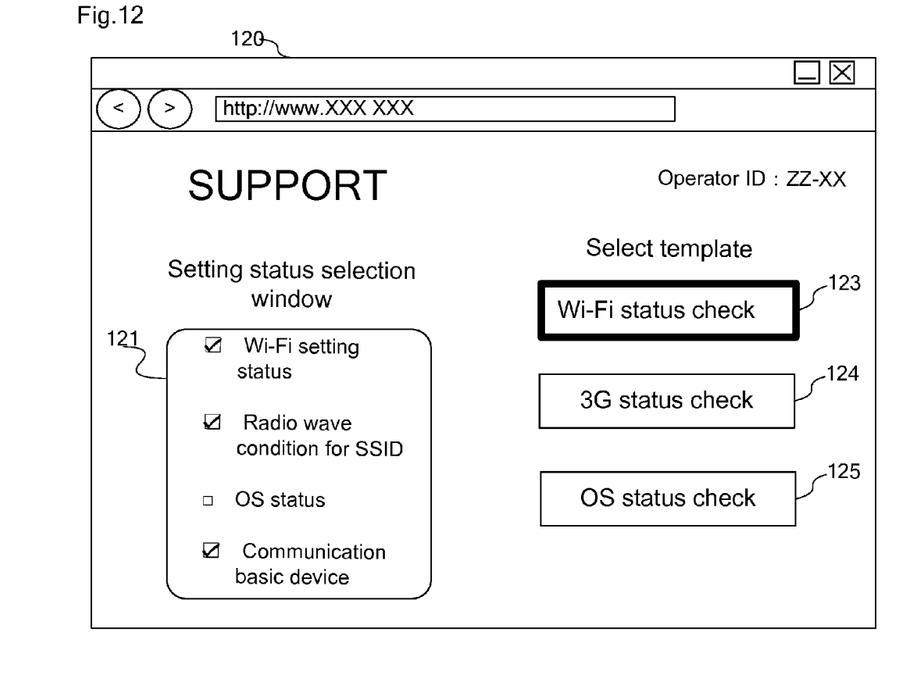
FIG. 12 shows the screen image of a select template output to an operator terminal 150.

As shown in FIG. 12, in the step S01 of the setting status reproduction process, the setting status check item is displayed on the operator terminal 150, and then a setting status check item set is output as select templates 123, 124, and 125 near the window. In this example, a setting status check item set of Wi-Fi status check 123 and 3G status check 124, and OS status check 125 is registered for the operator ID: ZZ-XX, and these items are accordingly displayed as select templates.

When one select template is selected, a setting status check item making up the setting status check item set is set as a setting status check item. (For example, a check box corresponding to an item that applies in the setting status selection window is checked.)

The present process makes it possible to associate an operator ID with a setting status check item set. In other words, since made up in plural, setting status check items can be treated as a setting status check item set and can be read out with respect to each operator ID.

An operator ID is described above, but a call center ID to which one ID is set with respect to each call center may be used, or a terminal ID to which one ID is set with respect to each operator terminal may be used.

The number of registered setting status check item sets for all operator IDs may be counted, and the items of a large number of registered setting status check item sets may be displayed as select templates. Accordingly, it is possible to prompt an operator to the items of a statistically large number of registered setting status check item sets as select templates.

Recommended Check Item Display Process

Figure 13:
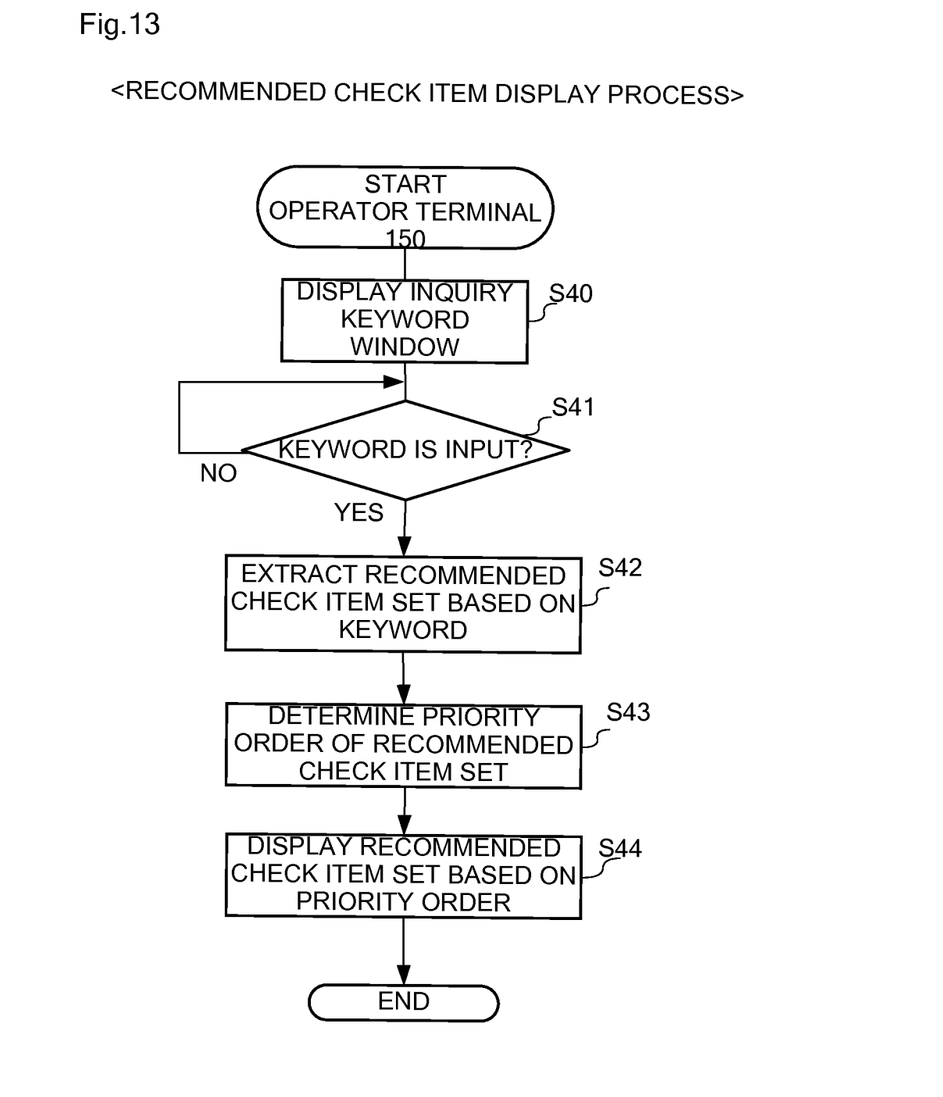
FIG. 13 shows the flow chart illustrating the recommended check item display process executed by an operator terminal 150.
Figure 14:
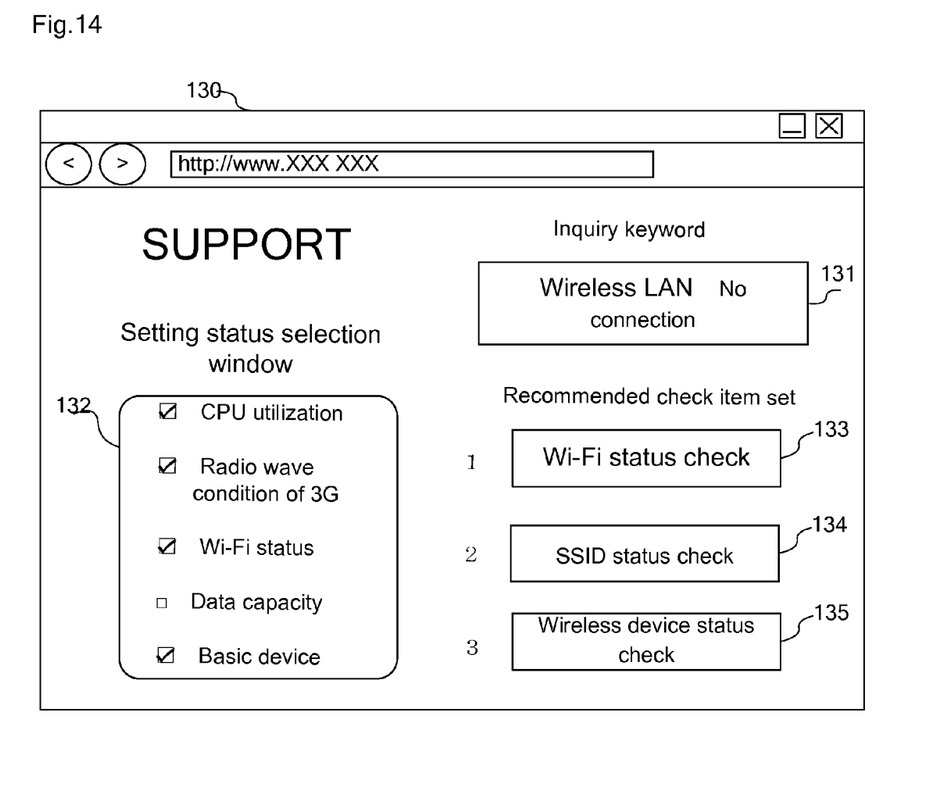
FIG. 14 shows the screen image of the inquiry keyword window output to an operator terminal 150.

The recommended check item display process will be explained with reference to FIGS. 13 and 14. In the step S01 of the setting status reproduction process, the operator terminal 150 displays a setting status check item (Step S01). At this time, the process from the step S40 of the recommended check item display process is executed in parallel.

The operator terminal 150 displays the inquiry keyword window 131 in the support screen 130 (Step S40). An operator inputs the keyword of an inquiry received from a user through phone, to this inquiry keyword window 131. For example, a user makes an inquiry to an operator, "My smart phone is not connected with the wireless LAN at home. How should I do for it?" At this time, as shown in FIG. 14, the operator inputs, for example, this inquiry keyword, "Wireless LAN" and "No connections" to the inquiry keyword window 131.

In the step S41, when an operator inputs an inquiry keyword (Step S41: "YES"), the process is moved to the step S42. The step S41 waits until an inquiry keyword is input (Step S41: "NO").

Then, the operator terminal 150 extracts a recommended check item set based on the inquiry keyword (Step S42). The recommended check item set is a setting check item set assumed from the inquiry keyword and supposed to be executed by an operator. The operator terminal 150 preliminarily stores an inquiry keyword in association with a recommended check item set. Specifically, the inquiry keywords "Wireless LAN" and "No connection" are stored in association with a recommended check item set. In this case, the recommended check item set indicates "Wi-Fi status check," "SSID status check," and "Wireless device status check.

Then, the priority order of a recommended check item set is determined (Step S43). Each recommended check item set is stored in association with a score with respect to each inquiry keyword. For example, in the inquiry keyword "Wireless LAN," the scores of "Wi-Fi status check," "SSID status check," and "Wireless device status check" may be "10," "8," and "6," respectively.

In addition, in the inquiry keyword, "No connection," the scores of "Wi-Fi status check," "SSID status check," and "Wireless device status check" may all be "3." As a result, in the total score of these two inquiry keywords, "Wireless LAN," "Wi-Fi status check," "SSID status check," and "Wireless device status check" would be "13," "11," and "9," respectively. Thus, the priority order of each recommended check item set is determined as "Wi-Fi status check," "SSID status check," and "Wireless device status check" in order.

Finally, the operator terminal 150 displays a recommended check item set based on the determined priority order (Step S44). As shown in FIG. 14, Wi-Fi status check 133, SSID status check 134, and Wireless device status check 135 are displayed in order from high to low score, with respect to each priority order. When one recommended check item set is selected, a setting status check item making up the recommended check item set is set as a setting status check item. (For example, a check box corresponding to an item that applies in the setting status selection window is checked).

The present process allows a user to inform an operator of a setting status check item set based on a keyword inquired by a user. Therefore, it is possible to prompt an operator to select a diagnosis item corresponding to diagnosis desired by a user.

To achieve the means and the functions as described above, a computer (including a CPU, an information processor, and various terminals) reads and executes a predetermined program. For example, a program is provided in forms recorded in a computer-readable record medium such as a flexible disk, a CD (CD-ROM, etc.), and a DVD (DVD-ROM, DVD-RAM, etc.). In this case, a computer reads a program from a record medium, forwards the program to internal or external storage to store the program therein, and executes the program. For example, the program may be preliminarily recorded in a memory device (record media) such as a magnetic disk, an optical disk, and a magnetic optical disk, and then provided from the memory device to a computer through a communication line.

The embodiments of the present invention are described above, but the present invention is not limited to these above-mentioned embodiments. The effects described in the embodiments of the present invention are merely listed as the most suitable effects produced from the present invention. The effect of the present invention is not limited to those described in the embodiments of the present invention.

REFERENCE SIGNS LIST 1 diagnostic code generation system
3 public line network
10 diagnostic code generation terminal
100 operator server
150 operator terminal

The invention claimed is:

1. A diagnostic method of reproducing the setting status of a diagnostic code generation terminal in an operator terminal, comprising the steps of:
receiving input by the operator terminal, in relation to a setting status check item being a setting item desired to be checked in the diagnostic code generation terminal;
generating a status check code by the operator terminal, so that the status check code indicates the setting status check item received in the input;
acquiring the setting status of the diagnostic code generation terminal by the diagnostic code generation terminal in response to receiving the input of the status check code, the setting status corresponding to the setting status check item;
generating a diagnostic code indicating the setting status based on the acquired setting status; and
reproducing the setting status of the diagnostic code generation terminal by inputting the diagnostic code to the operator terminal.

2. The diagnostic method according to claim 1 further comprising the steps of:
receiving an inquiry keyword by the operator terminal, the inquiry keyword being input by an operator;
extracting a setting status check item set recommended for the input from the operator based on the inquiry keyword; and
displaying the extracted setting status check item set on the operator terminal.

3. The diagnostic method according to claim 1, wherein the step of reproducing the setting status of the diagnostic code generation terminal based on the status check code and the diagnostic code.

4. The method of claim 1, wherein the first terminal and the second terminal are physically distinct machines coupled together over a public line network.

5. The method of claim 4, wherein receiving input by the operator terminal includes receiving a plurality of selections of setting status check items that indicate multiple features of the diagnostic code generation terminal to be checked, and wherein generating the status check code includes:
accessing, by the operator terminal, a status check code generation list that associates status check items with respective digit numbers;
generating a multi-digit value, the digits of the multi-digit value representing the respective status check items at digit positions of the multi-digit value designated by the respective digit numbers, each digit of the multi-digit value having a first value if the respective setting status check item is one of the received plurality of selections of setting status check items and having a second value otherwise; and
rendering the multi-digit value as the status check code.

6. The method of claim 5, wherein acquiring the setting status of the diagnostic code generation terminal includes:
an operator of the operator terminal reading the status check code from a display of the operator terminal;
the operator speaking the status check code to a user of the diagnostic code generation terminal over a telephone connection; and
the user of the diagnostic code generation terminal manually entering the status check code spoken to the user into a screen displayed on the diagnostic code generation terminal.

7. The method of claim 6, wherein generating the diagnostic code includes:
the diagnostic code generation terminal generating a respective diagnostic result for each of the plurality of selections of setting status check items; and
the diagnostic code generation terminal combining the respective diagnostics results to produce the diagnostic code.

8. The method of claim 7, wherein the diagnostic results are binary numbers and wherein combining the respective diagnostic results includes:
concatenating the diagnostic results to produce a combined binary result; and
converting the combined binary result to an equivalent hexadecimal number.

9. The method of claim 7, wherein reproducing the setting status of the diagnostic code generation terminal includes:
the user of the diagnostic code generation terminal reading the diagnostic code from a display of the diagnostic code generation terminal;
the user speaking the status diagnostic code to the operator of the operator terminal over the telephone connection; and
the operator of the operator terminal manually entering the diagnostic code spoken to the operator into a screen displayed on the operator terminal.

10. The method of claim 5, wherein acquiring the setting status of the diagnostic code generation terminal includes transmitting the status check code from the operator terminal to the diagnostic code generation terminal over the public line network.

11. The method of claim 10, wherein generating the diagnostic code includes:
the diagnostic code generation terminal generating a respective diagnostic result for each of the plurality of selections of setting status check items; and
the diagnostic code generation terminal combining the respective diagnostics results to produce the diagnostic code.

12. The method of claim 11, wherein the diagnostic results are binary numbers and wherein combining the respective diagnostic results includes:
concatenating the diagnostic results to produce a combined binary result; and
converting the combined binary result to an equivalent hexadecimal number.

13. The method of claim 11, wherein reproducing the setting status of the diagnostic code generation terminal includes transmitting the diagnostic code from the diagnostic code generation terminal to the operator terminal over the public line network.

14. A diagnostic code generation system comprising: a diagnostic code generation terminal and an operator terminal reproducing the setting status of the diagnostic code generation terminal, wherein
the operator terminal includes:
a check item input receiving module receiving input in relation to a setting status check item for selecting a setting status check item desired to be checked in the diagnostic code generation terminal;
a status check code generation module generating a status check code, so that the status check code indicates the setting status check item received in the input; and
the diagnostic code generation terminal includes:
a setting status acquisition module acquiring the setting status of the diagnostic code generation terminal in response to receiving the input of the status check code, the setting status corresponding to the setting status check item; and
a diagnostic code generation module generating a diagnostic code indicating the setting status based on the acquired setting status, and
the operator terminal further includes
a setting status reproduction module reproducing the setting status of the diagnostic code generation terminal by inputting the diagnostic code.

15. A computer program product for use in a diagnostic code generation system including a diagnostic code generation terminal and an operator terminal reproducing the setting status of the diagnostic code generation terminal, comprising;
a non-transitory computer usable medium having a set of instructions physically embodied therein; the set of instructions including:
computer readable program code causing the operator terminal to receive input in relation to a setting status check item for selecting a setting status check item desired to be checked in the diagnostic code generation terminal;
computer readable program code causing the operator terminal to generate a status check code, so that the status check code indicates the setting status check item received in the input;
computer readable program code causing the diagnostic code generation terminal to acquire the setting status of the diagnostic code generation terminal in response to receiving the input of the status check code, the setting status corresponding to the setting status check item;
computer readable program code causing the diagnostic code generation terminal to generate a diagnostic code indicating the setting status based on the acquired setting status; and
computer readable program code causing the operator terminal to reproduce the setting status of the diagnostic code generation terminal by inputting the diagnostic code.

* * * * *